US012143679B2

(12) United States Patent
Landow

(10) Patent No.: US 12,143,679 B2
(45) Date of Patent: *Nov. 12, 2024

(54) SYSTEMS AND METHODS FOR BLENDING INTERACTIVE APPLICATIONS WITH TELEVISION PROGRAMS

(71) Applicant: DISH NETWORK L.L.C., Englewood, CO (US)

(72) Inventor: Kate Megan Carney Landow, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,242

(22) Filed: Apr. 28, 2023

(65) Prior Publication Data

US 2023/0269436 A1      Aug. 24, 2023

Related U.S. Application Data

(63) Continuation of application No. 17/545,924, filed on Dec. 8, 2021, now Pat. No. 11,671,672, which is a
(Continued)

(51) Int. Cl.
*H04N 21/47* (2011.01)
*H04N 21/442* (2011.01)
(Continued)

(52) U.S. Cl.
CPC ... *H04N 21/4784* (2013.01); *H04N 21/44222* (2013.01); *H04N 21/4728* (2013.01); *H04N 21/47815* (2013.01); *H04N 21/8545* (2013.01)

(58) Field of Classification Search
CPC ......... H04N 21/4784; H04N 21/44222; H04N 21/4728; H04N 21/47815; H04N 21/8545;
(Continued)

(56) References Cited

U.S. PATENT DOCUMENTS 7,577,978 B1 * 8/2009 Wistendahl ........... A63F 13/338
725/111
8,312,486 B1 * 11/2012 Briggs ............... H04N 21/4725
725/32
(Continued)

OTHER PUBLICATIONS

U.S. Appl. No. 16/509,329, filed Jul. 11, 2019, Systems and Methods for Generating Coupons.

*Primary Examiner* — Timothy R Newlin
(74) *Attorney, Agent, or Firm* — Jeremiah J. Baunach; Frontier IP Law PLLC

(57) ABSTRACT

Object selection reward data, including rewards for viewer selection of objects of interest in presented media content of a video stream may be electronically communicated to the user automatically when the user electronically selects the object of interest as it is shown in the screen. Provided is improved functionality to activate an image in the video stream into an object that then can be selectable or become a part of an application running on a receiving device such as a set-top box or other media device. The received video may or may not be taken over by the application running on the set-top box. The video scaling can be preserved, and a part of the application. Alternatively, the whole of the visible video screen may not be a part of the application.

13 Claims, 7 Drawing Sheets

Related U.S. Application Data continuation of application No. 16/510,694, filed on Jul. 12, 2019, now Pat. No. 11,228,812.

(51) Int. Cl.
*H04N 21/4728* (2011.01)
*H04N 21/478* (2011.01)
*H04N 21/4784* (2011.01)
*H04N 21/8545* (2011.01)

(58) Field of Classification Search
CPC ....... H04N 21/23614; H04N 21/43074; H04N 21/4312; H04N 21/4348; H04N 21/4725; H04N 21/812; G06Q 30/0207
See application file for complete search history.

(56) References Cited

U.S. PATENT DOCUMENTS

| | | | |
|---|---|---|---|
| 8,359,399 B2 | 1/2013 | Landow et al. | |
| 8,424,037 B2 | 4/2013 | Landow et al. | |
| 8,849,945 B1* | 9/2014 | Desjardins | G11B 27/34 |
| | | | 725/35 |
| 8,997,155 B2 | 3/2015 | Landow et al. | |
| 9,009,339 B2 | 4/2015 | Landow et al. | |
| 9,544,660 B2 | 1/2017 | Landow et al. | |
| 9,571,872 B2 | 2/2017 | Landow | |
| 10,091,556 B1* | 10/2018 | Liden | H04N 21/41407 |
| 2002/0010923 A1* | 1/2002 | Pack | H04N 21/658 |
| | | | 348/E7.071 |
| 2002/0120934 A1* | 8/2002 | Abrahams | H04N 21/4316 |
| | | | 348/E7.071 |
| 2002/0133817 A1* | 9/2002 | Markel | G06Q 30/02 |
| | | | 348/E7.071 |
| 2002/0178020 A1* | 11/2002 | Simon | H04N 5/445 |
| | | | 705/1.1 |
| 2003/0171096 A1* | 9/2003 | Ilan | G06Q 30/02 |
| | | | 348/E7.054 |
| 2008/0196060 A1* | 8/2008 | Varghese | H04N 21/26258 |
| | | | 725/34 |
| 2011/0138334 A1* | 6/2011 | Jung | H04N 21/482 |
| | | | 345/156 |
| 2011/0289535 A1* | 11/2011 | Saffari | G06Q 30/0241 |
| | | | 725/61 |
| 2012/0304225 A1* | 11/2012 | Ritter | H04N 21/8583 |
| | | | 725/35 |
| 2013/0174191 A1* | 7/2013 | Thompson, Jr. | H04N 21/47815 |
| | | | 725/23 |
| 2013/0326570 A1* | 12/2013 | Cowper | H04N 21/4725 |
| | | | 725/109 |
| 2014/0085542 A1* | 3/2014 | Seifeddine | H04N 21/8583 |
| | | | 348/584 |
| 2014/0282638 A1* | 9/2014 | Pequignot | H04N 21/47815 |
| | | | 725/5 |
| 2015/0281793 A1* | 10/2015 | Wheatley | H04N 21/4882 |
| | | | 725/60 |
| 2016/0345076 A1* | 11/2016 | Makhlouf | G06Q 30/02 |
| 2018/0302682 A1* | 10/2018 | Saxena | H04N 21/4722 |
| 2019/0090025 A1* | 3/2019 | Chesson | H04N 21/466 |
| 2020/0128286 A1* | 4/2020 | Anders | H04N 21/23418 |

\* cited by examiner

SYSTEMS AND METHODS FOR BLENDING INTERACTIVE APPLICATIONS WITH TELEVISION PROGRAMS

TECHNICAL FIELD

The technical field relates to interactive applications, and particularly to blending interactive applications with television programs.

BRIEF SUMMARY

Systems and methods for blending interactive applications with television programs are disclosed. ATSC 3.0 is a version of the ATSC standards for television broadcasting created by the Advanced Television Systems Committee (ATSC). While ATSC 3.0 proposes applications as part of the ATSC signal and those applications are built around a browser, the present disclosure provides improved functionality to activate an image in the video stream into an object that then can be selectable or become a part of an application running on a receiving device such as a set-top box or other media device. Additionally, the received video may or may not be taken over by the application running on the set-top box. In an example where the received video is taken over by the application, the video scaling can be preserved, and a part of the application. Alternatively, the whole of the visible video screen may not be a part of the application. For example, if an image of a soda can is an object of interest in the received video, the system may in some embodiments, only have the image of the soda can as part of the application. An additional improvement is that the system enables more efficient purchasing while reducing interruption of enjoyment of the video stream. For example, if an advertisement in a video stream is being used to promote a movie, a user may click on the object identified in the advertisement by the application running on the set-top box and purchase the movie, yet the viewer is still enjoying their video stream.

An exemplary embodiment includes receiving, at a media device, a video program comprising a plurality of video frames, outputting, by the media device, the video program for presentation on a presentation device and electronically communicating a prompt to the user regarding a reward available for selection of one or more objects of interest within the plurality of video frames. The media device receives input indicative of user selection corresponding to a selected location on a video frame of the video program being output by the media device and determines that geometric identifiers of the selected location on the video frame correspond to geometric identifiers identifying a location within the video frame of an object of interest in the video frame. The media device then determines that the input indicative of user selection is a selection of the object of interest in the video frame based on the determination that the geometric identifiers of the selected location within the video frame corresponds to geometric identifiers identifying a location within the video frame of an object of interest in the video frame, and in response to this, electronically communicates object selection reward data.

Another exemplary embodiment includes electronically communicating a prompt to a user regarding a reward available for winning a competition between users for selection of a largest number of objects of interest within a plurality of video frames of one or more segments of a broadcast television video program broadcast to the users. The media device or other user device then receives input indicative of user selection corresponding to a plurality of selected locations on one or more video frames of the broadcast television video program. The media device then electronically communicates object selection reward data to the user based on the received input indicative of user selection corresponding to a plurality of selected locations on one or more video frames of the broadcast television video program.

BRIEF DESCRIPTION OF THE SEVERAL DRAWINGS

Preferred and alternative embodiments are described in detail below with reference to the following drawings:

FIG. 1 is a block diagram of an embodiment of an exemplary media access system, according to an example embodiment;

FIG. 2 conceptually illustrates a program stream that communicates, transports, or otherwise carries, the program of interest to a media device and/or a portable media device, according to an example embodiment;

DETAILED DESCRIPTION

Media content received on media devices, such as cable and satellite television receivers, streaming media devices and other set-top boxes, may be presented on a media presentation device, such as a television, computer system, game system, or the like. The media content, such as a television program, a broadcast sports event, a movie, an advertisement or the like, is received in the form of a video stream and a synchronized audio stream. Once received and processed, the video stream is presented on a display and the associated audio stream is output from one or more speakers in a synchronized fashion.

Within the video itself, various recognizable objects may be presented to the user. For example, an image of an object of interest, such as an actor, a beverage container, or an automobile, may be shown in the presented video. However, it is difficult for systems of advertisers, sellers and manufacturers of products related to the object to determine whether a viewer has actually viewed the object. To solve this technical problem, object selection reward data, including rewards for viewer selection of objects of interest in the presented media content may be electronically communicated to the user automatically when the user electronically selects the object of interest as it is shown in the screen. For example, an advertiser or manufacturer of a product related to the object of interest, or internet sites of such entities, may provide object selection reward data pertaining to the currently received program, sporting event, or movie. Such object selection reward data may be data identifying or related to a reward for the user selecting the object of interest and, in some embodiments, may include a code or identifier that represents the reward or that is used to redeem the reward. For example, the reward may be, but is not limited to, one or more of: a coupon for a product related to the object of interest, a product related to the object of interest, a service related to the object of interest, information related to the object of interest, a financial reward, and one or more points in a rewards system.

Figure 1:
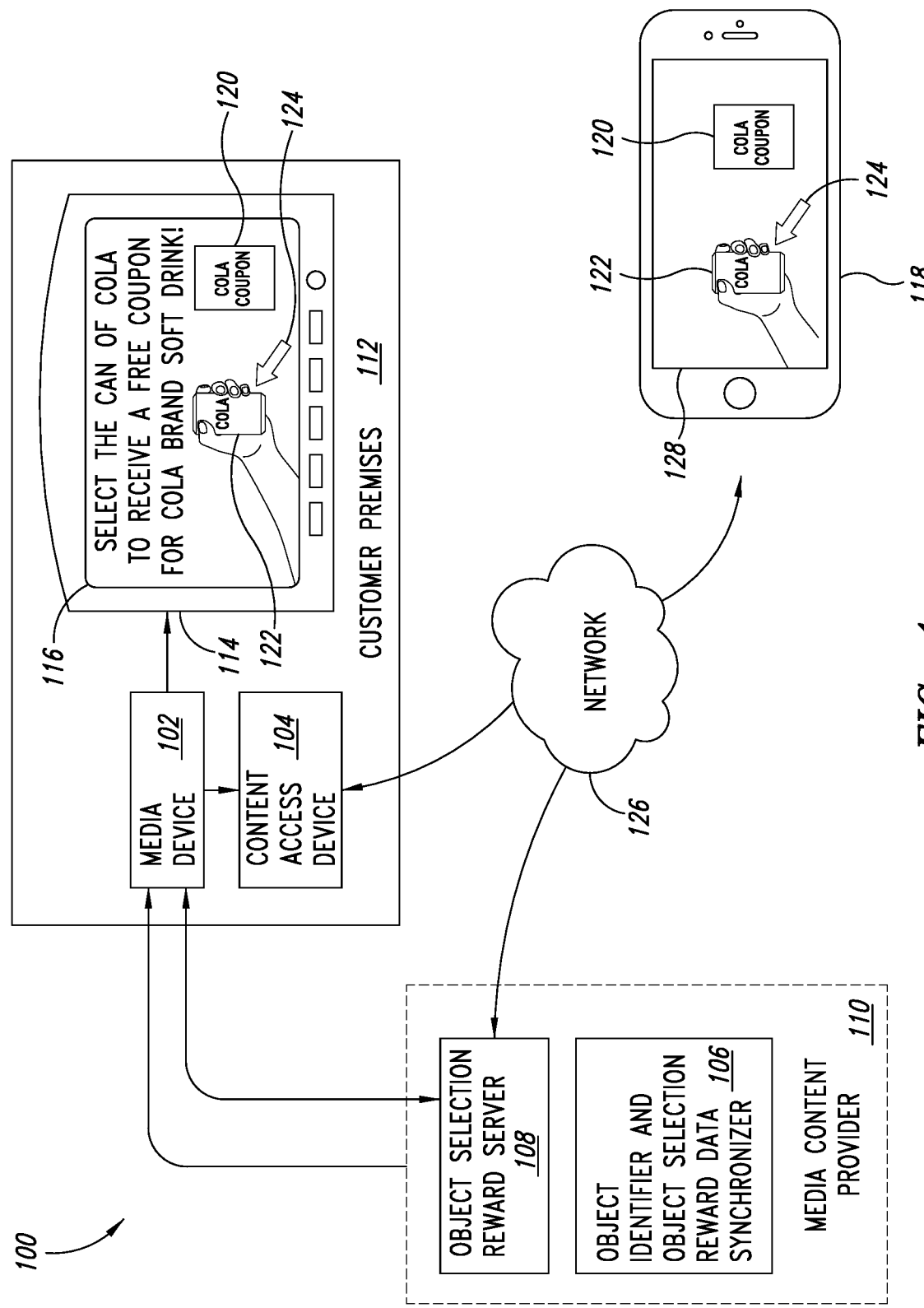

FIG. 1 is a block diagram of an embodiment of an exemplary media access system 100. Embodiments of the media access system 100 comprise a media device 102, an optional content access device 104, an object identifier and object selection reward data synchronizer 106, and an object selection reward server 108.

Examples of the media device 102 include, but are not limited to, a set top box (STB) or the like, that is configured to receive media content from a media content provider 110. The media device 102 may be located at a customer premises 112, such as their residence, office, or other suitable location. The media device 102 is typically connected to one or more media presentation devices 114. Non-limiting examples of the media presentation devices 114 include televisions (TVs), stereos, surround-sound receivers, radios, digital video disc (DVD) players, digital video recorders (DVRs), game playing devices, or personal computers (PCs). The media presentation device 114 may include a visual display device 116, such as a television (hereafter, generically a TV). Other types of output devices may also be coupled to the media device 102, such as an audio presentation device and/or those providing any sort of stimuli sensible by a human being, such as temperature, vibration and the like. For example, the media presentation device 114 is illustrated as a TV that includes a display 116 that is presenting a video portion of a television program featuring a product placement, tie-in or advertisement for a soft drink.

In some embodiments, object selection reward data pertaining to the program of interest may be available from a remote source. More particularly, the available object selection reward data may pertain to an identifiable object of interest that is being presented on the TV 114 and/or the portable media device 118. In this exemplary embodiment, the object selection reward data is content that pertains to the media content, but is not included as part of the originally generated media content. In some embodiments, the object selection reward data is data representative of a point in a point system or other reward stored in and/or associated with an account of the user locally or at a remote location, such as the object selection reward server 108.

In other situations, the object selection reward data pertaining to the media content is included as part of the originally generated media content. For example, the object selection reward data may be included as part of the originally generated media content. Alternatively, or additionally, the object selection reward data may be added into the media content after the media content is originally generated.

In an exemplary embodiment, the object selection reward data may comprise a menu, a pop-up window, a web page, or the like. For example, the menu, a pop-up window, a web page, or the like may be or represent a coupon or other reward for an object of interest in the presented media content, and/or may comprise additional information related to the object of interest. In some instances, the object selection reward data may be presented as audio information. For example, the object selection reward data may comprise audio available from an MP3 library, with the object selection reward data presenting audio information or music such as liner notes or related music scores.

In an exemplary embodiment, the object selection reward server 108 functions as a repository of the object selection reward data pertaining to one or more presented identifiable objects of interest and/or selections of such objects of interest by the user. As the selected program of interest is presented to the user, embodiments of the media access system 100 permit the user to operate the media device 102 and/or the portable media device 118 to access the object selection reward data pertaining to the selected object of interest that is being is presented on the TV 114 and/or the portable media device 118. Once the user has selected the object of interest, the related object selection reward data (e.g., data representing a coupon or other reward) may presented as graphical content 120 on the TV 114 and/or the portable media device 118. In other embodiments, the related object selection reward data may be communicated to the user via text, email, chat application, or other communications mediums. In some embodiments, the related object selection reward data may also or instead be an indication electronically communicated to the object selection reward server 108 such that an advertiser, manufacturer, promoter or seller of the product or service related to the selected object of interest may, via communication with the object selection reward server 108, record a credit, point or other reward attributed to the user or an account associated with the user who selected the object of interest.

The graphical content 120 corresponding to the object selection reward data may indicate to the user a coupon related to the selected object of interest or other reward. In some applications, the graphical content 120 corresponding to the object selection reward data may simply present information of interest pertaining to the selected object of interest. As an example, an application running on the media device 102 or media device 118 can run over a baseball game presented in video received by the media device 102 or media device 118. While viewing the baseball game, the user can click a player to see ERA, RBI, and statistics against the current pitcher, etc. In other applications, the graphical content 120 associated with the object selection reward data may be interactive with the user. In an exemplary embodiment, the graphical content 120 may present a choice to the user that is intended to be responded to by the user. For example, the user may be able to rate or comment on a product related to the presented object of interest, play an interactive game or compete in an interactive competition via the graphical content 120 related to the presented object of interest, or vote on an issue or the like that is related to the presented object of interest. Such interactivity and games may be software applications individualized for a particular object of interest, related product or service or brand, and may be stored on, run by and/or accessed by the media device 102 and/or portable media device. Such software applications may be delivered with the corresponding video program or via other channels. Launching of such applications may be triggered by or as a result of detection of the object of interest by the media device 102 and/or portable media device 118, or by processing of the corresponding object of interest data is received with the video program associated with the object of interest.

As another non-limiting example, the graphical content 120 may be a coupon, discount or advertisement that is configured to allow the user to selectively purchase a product in the advertisement using such coupon or discount. The coupon, discount or advertisement may be related to, or may not be related to, the subject matter of the object of interest. For example, the graphical content 120 presented as a coupon, discount or advertisement (the object selection reward data) may be targeted to the user to induce the purchase of a product that is related to, or is even competing with, the selected object of interest.

FIG. 1 illustrates presentation on the TV 114 of a television program featuring a product placement or advertisement for a soft drink, which a soda can 122 being the object of interest. For example, a broadcasting entity may be broadcasting a television program that is communicated to the user's media device 102 and/or portable media device 118. Exemplary object selection reward data may include data regarding or indicative of one or more of: a coupon for a product related to the object of interest, a product related to the object of interest, a service related to the object of interest, information related to the object of interest, a financial reward, and one or more points in a rewards system. Such object selection reward data may be available from another resource. Promotional merchandise such as clothing, hats and accessories, and informational data merchandise may also be available from a web site or remote source identified or provided by the object selection reward data. In this example, the soda can 122 is an identifiable object of interest that is being presented on the video portion of the program of interest presented on the display 116.

In this exemplary embodiment, the user may navigate a pointer 124 about the display to overlay, or be in proximity to, the soda can 122. Upon selection, such as by actuation a controller that is used to navigate the pointer 124 about the display 116, object selection reward data associated with the soda can is accessed from the object selection reward server 108 and is presented on the display 116 as the graphical content 120. In an advertisement application, the presented interactive graphical content 120 associated with object selection reward data may correspond to coupons, discounts on merchandise or the like pertaining to the soda can 122, the brand of soda, sponsors, activities, promotional material and other reward data. In this simplified example, in response to the user selecting the object of interest, the media device communications such interaction to the object selection reward server to record such interaction and communicate a reward or take other action, such as aggregating interactions of multiple different users to determine market trends and credit the users accordingly for issuance of coupons and/or other rewards. Also, the soda and/or related merchandise (or a coupon therefor) may be available as a reward or for purchase (e.g., at a discount) by the user selecting the graphical content 120 to access the object selection reward server 108 to have the reward electronically sent to the user or to redeem the reward and/or to place a product or merchandise order through the object selection reward server 108. In an exemplary embodiment, if the user is interested in purchasing one or more products or items of merchandise, the user simply navigates the pointer 124 about the presented graphical content 120 and makes their purchase selection.

In another exemplary application, the interactive graphical content 120 may permit the user to play a game, or may launch presentation of the game. In some exemplary game applications, a special control panel, console, or the like may be presented around the selected object of interest to provide interactive capability between the user, the game, and the presented program of interest. The user may interact with the presented graphical content 120 by inputting commands and/or instructions using their media device 102, their portable media device 118, or a suitable controller. For example, the media device 102 or portable media device 118 may electronically communicate a prompt to a user regarding a reward available for winning a competition between users for selection of a largest number of objects of interest within a plurality of video frames of one or more segments of the broadcast television video program broadcast to the users. The media device 102 or portable media device 118 may then receive input indicative of user selection corresponding to a plurality of selected locations on one or more video frames of the broadcast television video program. The object selection reward server 108 media device 102, and/or the portable media device 118 may electronically communicate object selection reward data to the user based on the received input indicative of user selection corresponding to a plurality of selected locations on one or more video frames of the broadcast television video program. The object selection reward server 108 media device 102, and/or the portable media device 118 may determine that the input indicative of user selection corresponding to the plurality of selected locations on the one or more video frames of the broadcast television video program is selection of the number of objects of interest within the plurality of video frames based on a determination that geometric identifiers of the selected locations on the one or more video frames of the broadcast television video program corresponds to geometric identifiers identifying locations on the one or more video frames of the objects of interest within the plurality of video frames. In some instances graphical content such as prompts for the user to select particular objects of interest may be overlaid on the video program by the object identifier and object selection reward data synchronizer of the media content provider 110, media device 102, and/or portable media device 118. The media device 102, and/or portable media device 118 may have an equivalent object identifier and object selection reward data synchronizer included therein for identifying objects of interest and performing such actions. For example, the prompt "select the can of cola to receive a free coupon for cola brand soft drink" shown in FIG. 1 may be overlaid on the video program by the object identifier and object selection reward data synchronizer 106 of the media content provider 110, media device 102, and/or portable media device 118. In some interactive game applications, the user may toggle or switch between game playing enabled by the object selection reward data and the presentation of the program of interest.

The graphical content 120 may be presented in a variety of formats. The graphical content 120 may present the object selection reward data using text, images, videos, and/or graphical icons. The graphical content 120 may be overlaid on or integrated with the video program by the object identifier and object selection reward data synchronizer 106 of the media content provider 110, media device 102, and/or portable media device 118. In an exemplary embodiment, the graphical content 120 may comprise a menu, a pop-up window, a web page, or the like. In some instances, the object selection reward data may instead or also be presented as audio information from a presentation device configured to produce audio information. For example, object selection reward information may comprise audio available from an MP3 library, with the object selection reward being presentation of audio information, such as liner notes, music, such as related music scores, and/or a narration. The plurality of different graphical content 120 may be available for different types of media devices 102 and/or the portable media devices 118.

In an exemplary embodiment, an identifier of the media device 102 and/or portable media device 118 may be received by the object selection reward server 108. Accordingly, the format of the graphical content 120 may be tailored for presentation by that particular media device 102 and/or portable media device 118. The identifying information may be a serial number, a cellular number, a device make and/or model identifier, or another suitable identifier that indicates the type of and/or characteristics of the media device 102 and/or portable media device 118. For example, the portable media device 118 may be a cellular phone with a small display. The object selection reward server 108 may then provide the object selection reward data that is suitable for presentation on that particular display. On the other hand, the portable media device 118 may be a sophisticated electronic device where the display 124 is touch sensitive and relatively large. The object selection reward server 108 may then provide the object selection reward data in a larger size, and may optionally include interactive features that are configured to be responsive to input from the touch sensitive display 124.

The graphical content 120 may be presented in any suitable fashion with respect to the presented video portion of the program of interest. For example, the program of interest and the graphical content 120 may be presented in a side-by-side format as illustrated in FIG. 1. Alternatively, the graphical content 120 may be overlaid on top of, or over a portion of, the presented program of interest. The graphical content 120 may be presented using a watermark format wherein the graphical content 120 is presented using some degree of transparency over the presented program of interest. Yet another presentation format may present the graphical content 120 in a banner form that presents text and or images. The graphical content 120 may even be presented as information that scrolls across the banner.

In some instances, the user may wish to access the media content received at their media device 102 when they are remote from the customer premises 112. In an exemplary embodiment, the user operates their portable media device 118 to establish a communication link to the content access device 104, via the network 126. In other embodiments, the portable media device 118 may access media content in other manners. Exemplary portable media devices 118 include, but are not limited to, smartphones, laptop computers, notebook computers, gaming devices, personal device assistants (PDAs), netbooks, cellular-based devices, Internet accessible devices, an Internet of Things (IoT) device and/or Wi-Fi accessible devices.

In the exemplary embodiment, the content access device 104 is controllably connected to the media device 102 and is configured to cause the media device 102 to access a particular program of interest in accordance with a specification from the user. In an exemplary embodiment, the user may communicate instructions from their portable media device 118 to the content access device 104 to specify the channel that is providing the program of interest, to specify the station call sign of the source station that is broadcasting the program of interest, and/or to specify another suitable identifier of the program of interest. In some embodiments, the user may specify the program of interest by navigating about an electronic program guide (EPG). The content access device 104 receives the specified program of interest from the media device 102, and then transmits the program of interest to the user's portable media device 118. In an alternative embodiment, the media device 102 and the content access device 104 may be integrated together.

The content access device 104, in some embodiments, may be configured to reformat or process the program of interest into a format or the like that is compatible with the data requirements of the portable media device 118 and/or that is compatible with a data transmission bandwidth of the communication link to the portable media device 118. For example, the program of interest received from the media device 102 may be in a format that is suitable for presentation of a standard definition or high definition TV. In contrast, the portable media device 118 may be a cellular phone or a laptop computer with a relatively smaller display. Alternatively, or additionally, the communication link to the portable media device 118 may not have sufficient bandwidth to transmit the received format version of the program of interest to the portable media device 118. In such situations, the content access device 104 processes the program of interest into a format that is suited for transmission over the established link between the content access device 104 and the portable media device 118.

When the user selects an object of interest that is being presented on the program of interest, in some embodiments, the portable media device 118 may establish a communication link to the object selection reward server 108 so that the object selection reward data associated with the object of interest may be accessed by the portable media device 118 and presented as the graphical content 120 on the display 128. In some embodiments, the communication link between the content access device 104 and the portable media device 118 is established over the network 126. In other embodiments, a separate path may be used to establish the communication link between the content access device 104 and the portable media device 118.

For example, the user may wish to view the presentation of a television show while at a remote location. The user operates their portable media device 118 to establish the communication link to the content access device 104 and requests presentation of a particular television show. The television show is communicated from the media device 102 to the content access device 104. The content access device 104 may then reformat the media content carrying the television show to comply with bandwidth capacity limits and/or to comply with the display requirements of the particular portable media device 118. The formatted television show is then communicated over the network 126 to the portable media device 118. The user is then presented a video image of the television show on the display 128 of the portable media device 118. When the user selects an object of interest that is being presented on the program of interest, such as the exemplary soda can 122, the portable media device 118 establishes a communication link to the object selection reward server 108, so that the interactivity of the user with the object of interest may be recorded by the object selection reward server 108 as object selection reward data and, in some embodiments, so that additional object selection reward data associated with the object of interest may be accessed by the portable media device 118 and presented as the graphical content 120 on the display 128. In some embodiments, the media device 102 and/or the portable media device 118 may also or instead present corresponding object selection reward data already stored on the media device 102 and/or the portable media device 118.

Figure 2:
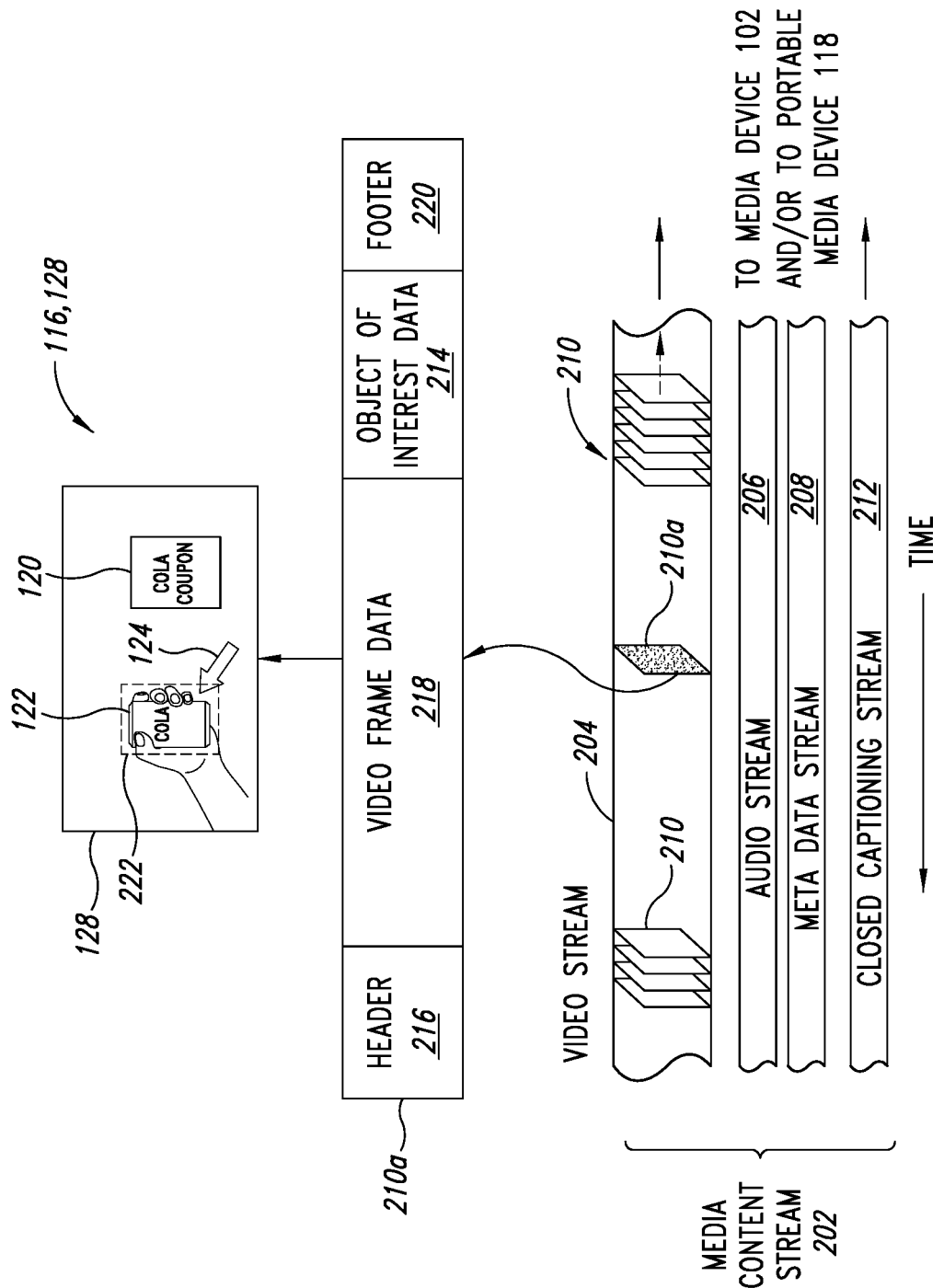

FIG. 2 conceptually illustrates an example media content stream 202 that communicates, transports, or otherwise carries, the program of interest to the media device 102 and/or the portable media device 118. The media content stream 202 comprises a video stream 204, a corresponding audio stream 206, and a corresponding metadata stream 208.

The video stream 204 is comprised of a plurality of serially sequenced video frames 210. Each video frame 210 has data or information used to render and present a particular image of the program of interest. The video frames 210 are serially presented so as to create a moving picture. For example, the video frame 210a is used to generate the presented image that includes the image of the soda can 122, where the soda can is the object of interest that is associated with the graphical content 120.

The audio stream 206 may include spoken words, music, and background sounds. The audio stream 206 is sequenced with the video frames 210 such that spoken words, music, and background sounds of the audio stream 206 correspond in time with the moving picture. Some media content streams 202 may include a metadata stream 208 which contains other information of interest.

An optional closed captioning stream 212 is also conceptually illustrated as part of the media content stream 202. The closed captioning stream 212 is typically a textual presentation of the words of the audio stream 206 for hearing impaired viewers or for viewers in an area with relatively loud ambient noise levels, such as a bar or the like. The words of the closed captioning stream 212 are sequenced so as to generally correspond to the spoken words of the audio stream 206.

In some embodiments, to provide access to the object selection reward data, the media access system 100 incorporates object of interest data 214 that resides in the video stream 204 of the media content stream 202 carrying the program of interest. In the illustrated exemplary embodiment, the object of interest data 214 is embedded or otherwise incorporated into the video frame 210. For example, recent moving picture experts group (MPEG) formats, the material exchange format (MXF), and other packetized video formats, provide for portions in the video stream 204 that are configured to carry various non-video data.

In other embodiments, the object of interest data is associated with one or more of the video frames 210. For example, the object of interest data 214 may be interleaved or otherwise incorporated between video frames 210. As another example, the object of interest data 214 may be added or inserted into the video stream 204 between the video frame 210 associated with the generated object of interest data and an adjacent video frame 210. Alternatively, the object of interest data 214 may be embedded or otherwise incorporated into the audio stream 206, the metadata stream 208, and/or the closed captioning stream 212 of the media content stream 202. Alternatively, or additionally, the object of interest data 214 may be separately communicated to or generated by the media device 102 and/or the portable media device 118.

In an exemplary embodiment, each particular video frame 210 that presents a scene with the identified object of interest includes the object of interest data 214. The object of interest data 214 comprises information to identify the object of interest in the presented scene. For example, the video frame 210a is used to generate the presented image that includes the image of the soda can 122. The object of interest data 214 includes information that identifies where the soda can is in the video frame 210.

The exemplary video frames 210 comprise a header 216, video frame data 218, object of interest data 214, and a footer 220. The header 216 includes information that identifies the start of each video frame 210, and may include information that identifies various characteristics of the video frame 210. The footer 220 includes information that identifies the end of each video frame 210, and may also include information that identifies various characteristics of the video frame 210. The video frame data 218 includes the video data or information that is used to render the image that is presented on the displays 116 and/or 128. In exemplary embodiments, the object of interest data 214 may reside in or may be otherwise incorporated into any portion of the video frame 210.

In an exemplary embodiment, the information in at least one of the object of interest data 214 comprises information used to establish the communication link between object selection reward server 108 and the content access device 104, and/or establish the communication link between the object selection reward server 108 and the portable media device 118. For example, a web site address and/or other information to access object selection reward data may be included in the object of interest data information. When object of interest data 214 having the information to establish the communication link is processed, embodiments may automatically establish the communication link to the object selection reward server 108. In some embodiments, once the communication link is established, subsequent object of interest data 214 do not need to have the information to establish and/or maintain the communication link so long as the communication link remains established when that subsequent object of interest data 214 is processed. In some embodiments, a later processed object of interest data 214 may have information that closes the communication link to the object selection reward server 108, and/or that causes a change to different graphical content 120 presenting different object selection reward data.

The object of interest data information may further comprise object location information that identifies the location of the object of interest in the presented image generated from the associated video frame 210. In response to processing embedded object of interest data 214, the portion of the currently presented video frame 210 that includes the displayed object of interest is configured so that the object of interest presented in that particular video frame 210 becomes interactively selectable by the user. For example, the location of the soda can 122 in the presented image will be included in the object of interest data such that when the pointer 124 is located over or in proximity to the soda can 122, the soda can 122 becomes a selectable object of interest. In contrast, when the pointer 124 is located over other areas of the presented image that is generated from the video frame 210, the interactive object selection features of the object of interest are not active.

The location of the object of interest in the presented scene may be identified or described in any suitable manner. In an exemplary embodiment, a geometric region 222 is defined so that the geometric region 222 corresponds substantially to the location of the object of interest in the video frame 210. The geometric region 222 may be represented as any suitable region, such as a rectangular region, an oval region, a circular region, or a triangular region. For example, once the object of interest is identified in the video frame 210, the exemplary rectangular geometric region 222 may be used to define an area that encompasses all of, or a part of, the object of interest. Here, the location of the exemplary geometric region 222 may be identified or described by its "x" and "y" coordinates in the video frame 210. In other embodiments, the exemplary geometric region 222 may be identified by a vector or the like. In other embodiments, the geometric region 222 may more closely correspond to the object of interest. For example, if the object of interest is the exemplary soda can 122, the geometric region 222 may correspond to the outline of the soda can 122. Any suitable geometric region 222 may be defined and associated with the object of interest such that when the user navigates the pointer 124 or the like about the display to overlay, or be in proximity to, the geometric region 222, the object of interest data 214 becomes active and may be selectable by the user.

In alternative embodiments, some of the object of interest data information may be embedded in or otherwise incorporated into the audio stream 206, the metadata stream 208, and/or the closed captioning stream 212 of the media content stream 202. Alternatively, or additionally, the object of interest data may be separately communicated to the media device 102 and/or the portable media device 118. In some embodiments, the media device 102 and/or the portable media device 118 identify the object of interest in real time or near real time as the video program is being received by the media device 102 and/or the portable media device 118 and the media device 102 and/or the portable media device 118 then generates the object of interest data based on such identification. The whole of the visible video screen may not be a part of the application running on the media device 102. For example, if the soda can 122 is detected as an object of interest in the received content stream 202, the system may in some embodiments, only have the image of the soda can as part of the application. As another example, the application running on the media device can run over a baseball game. The user can click a player to see ERA, RBI, and statistics against the current pitcher, etc. An additional improvement is that the system enables more efficient purchasing while reducing interruption of enjoyment of the video stream. For example, a user may click on soda can 122 identified by the application running on the media device 102 and purchase the soda, while the viewer is still enjoying the video of the content stream 202.

Alternatively, or additionally, the object selection reward data may be included in the media content stream 202. The object selection reward data may be part of the object of interest data 214 in an exemplary embodiment. The object selection reward data may be included in the video stream 204, the audio stream 206, the metadata stream 208, and/or the captioning stream 212 in other embodiments. Further, different object selection reward data may reside in different portions of the media content stream 202.

Figure 3:
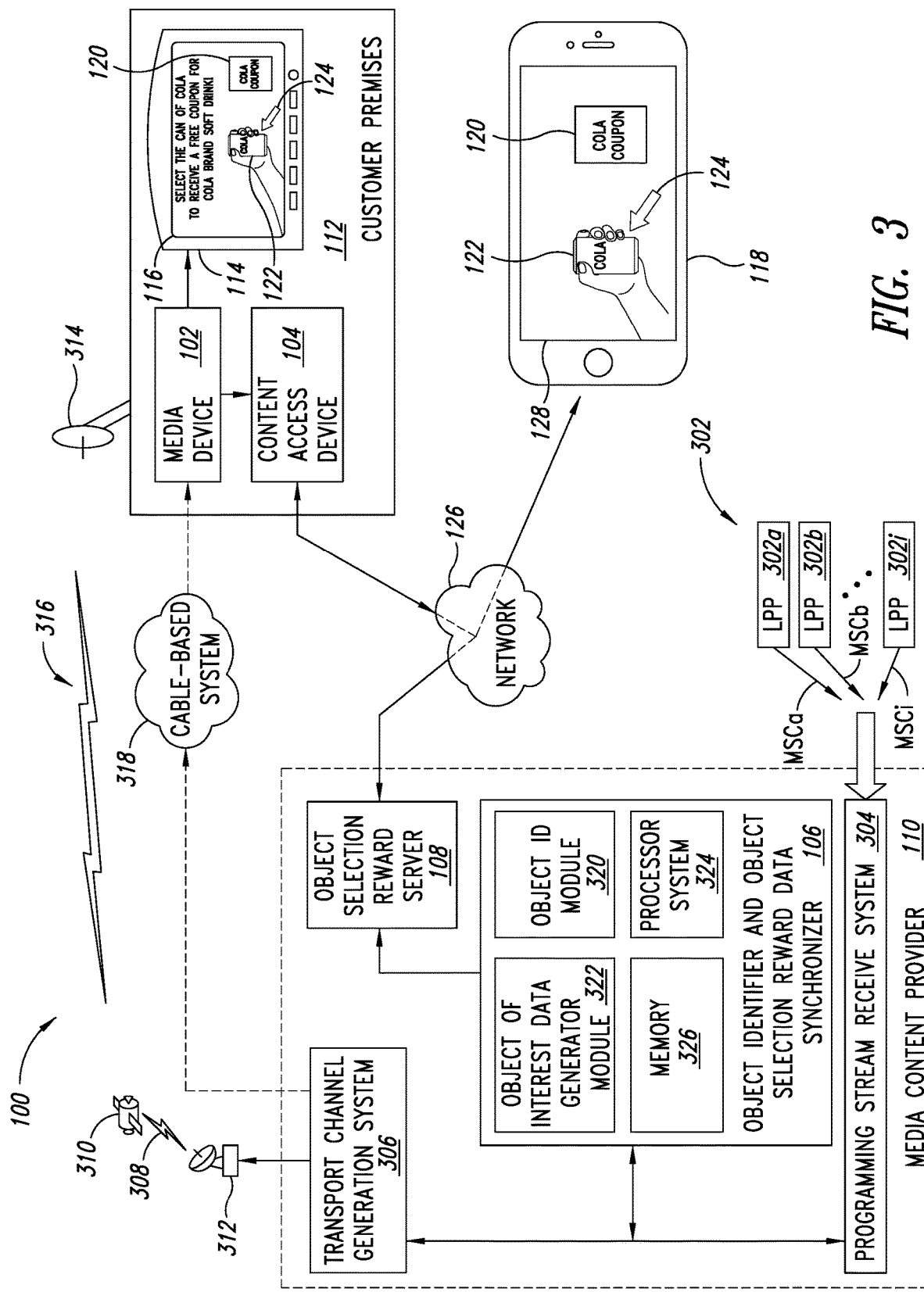
FIG. 3 illustrates in greater detail an exemplary embodiment of the media access system, according to an example embodiment.

FIG. 3 illustrates in greater detail an exemplary embodiment of the media access system 100. To facilitate disclosure of the exemplary embodiment of the media access system 100, operation of the exemplary environment that provides media content to the media device 102 and/or the portable media device 118 is described.

The media content provider 110 receives the plurality of media content streams MCSa-MCSi from a plurality of local program providers (LPPs) 302 at its programming stream receive system 304. The programming stream receive system 304 processes the received media content streams MCSa-MCSi as necessary to prepare them for transmission to the customers. For example, commercials, advertisements, product placements or tie-ins, or the like, may be incorporated with a particular one of the media content streams MCSa-MCSi. Further, the media content streams MCSa-MCSi may be associated with identifiers, such as channel number and/or station call signs.

The processed media content streams MCSa-MCSi are communicated from the programming stream receive system 304 to an optional transport channel generation system 306. In an exemplary satellite-based media system, the transport channel generation system 306 bundles selected ones of the media content streams MCSa-MCSi into one or more transport channels 308. Then, one or more of the transport channels 308 (with the media content comprising the object of interest data 214) are uplinked to a satellite 310, via a corresponding transmit antenna 312. The respective transport channels 308 are then communicated from the satellite 310 down to a receiver antenna 314 located at the customer premises 112. The received wireless signal 316 with the transport channel(s) 308 therein is then communicated to the media device 102. The receiver antenna 314 and the media device 102 may be configured to receive multiple transport channels from a plurality of satellites 310.

Alternatively, or additionally, media content comprising the object of interest data 214 may be provided to the media device 102 over other systems. For example, the media content system provider 110 may communicate the media content with the object of interest data 214 over a cable-based system 318. The cable-based system 318 may use a fiber optic cable, a coaxial cable, or the like that couples the media device 102 to the cable-based system 318.

Media content with the object of interest data 214 may be communicated to the media device 102 and/or to the portable media device 118 using other media. For example, the media content and the object of interest data 214 may be communicated over the Internet.

In another situation, the media content with the object of interest data 214 may be provided from a memory medium, such as a digital video disk (DVD) or the like. When the program of interest is retrieved from the memory medium, the object of interest data 214 cause the media device 102 and/or the portable media device 118 to access and present the graphical content 120 and communicate such interaction to the object selection reward server in the event that the user chooses to select the object of interest when it is visible on the image presented on the displays 116, 128.

In some situations, the program of interest with the object of interest data 214 may be saved into a storage medium or device, such as a digital video recorder (DVR) residing in the media device 102, saved into a hard drive residing in the portable media device 118, or saved into an external memory device that is coupled to the media device 102, the media presentation device 114, and/or the portable media device 118. When the stored program of interest with the object of interest data 214 is accessed by the media device 102 and/or portable media device 118, then the object selection reward data is accessed and presented to the user upon selection of the object of interest identified in the object of interest data 214.

The object selection reward data may be created by a variety of entities. In an exemplary application, the object selection reward data is created by the object selection reward server 108 or other system associated with a manufacturer, advertiser or seller of a product or service related to the object of interest. In some embodiments, the object selection reward server 108 is a system of the media content provider or other television service provider. In another exemplary application, the object selection reward data is created by the particular LPP 302 that is originating the program of interest. In this case, the object selection reward data is communicated from the originating LPP 302 to the programming stream receive system 304. The object selection reward data may then be communicated to the object selection reward server 108 and/or the object identifier and object selection reward data synchronizer 106. In other situations, the object selection reward data may be communicated from the originating LPP 302 directly to the object identifier and object selection reward data synchronizer 106.

In an alternative application, the object selection reward data may originate from another source. The object selection reward data originating from other sources may be communicated to the object selection reward server 108, the object identifier and object selection reward data synchronizer 106, the media device 102 and/or the portable media device 118. The received object selection reward data may then be saved for later access by the media device 102 and/or portable media device 118.

In an exemplary embodiment, the object of interest data 214 and object location information included in the object of interest data 214 are generated by the object identifier and object selection reward data synchronizer 106. An exemplary object identifier and object selection reward data synchronizer 106 comprises an object identification (ID) module 320, an object of interest data generator module 322, a processor system 324, and a memory 326.

The object ID module 320 is configured to recognize and/or identify a specified object of interest in a video frame 210. Further, the object ID module 320 is configured determine the location of the object of interest in the video frame 210.

The object ID module 320 comprises (and/or executes) object recognition logic that identifies and determines the location of object of interest in the video frame 210. The object recognition logic may be software that employs any suitable methodology that identifies and determines the location of the object of interest in the video frame 210. For example, but not limited to, the object ID module 320 may employ edge matching techniques, divide-and-conquer search techniques, color and/or grayscale matching techniques, gradient matching techniques, eigenvector analysis techniques, geometric hashing techniques, scale-invariant feature transform (SIFT) techniques, speeded up robust features (SURF) techniques, and/or template matching techniques.

Once the object of interest has been identified and location in the video frame 210, characteristics of the geometric region 222 and its location may be defined. The information defining the geometric region 222 corresponding to the identified location of the object of interest is then incorporated into the object of interest data. In an alternative embodiment, the geometric region 222 may be defined by the known location of a point in the video frame 210. A larger geometric region 222 and the location of the larger generated geometric region 222 may be generated by the media device 102 and/or the portable media device 118.

In a series of sequentially presented video frames 210 that are used to generate a video clip of a particular scene having the object of interest presented therein, a difference in a shape, a size, an orientation, a color, a brightness, or other characteristic of the object of interest between adjacent ones of the video frames 210 is likely to be relatively small. Accordingly, rather than identifying and determining the location of object of interest in each and every video frame 210, the determined geometric region 222 that identifies and defines the location of the object of interest may be used for a plurality of video frames 210 where the characteristics of the object of interest in each of the video frames 210 are similar. If a comparison of the location information for the object in the video frames indicates that the same geographic information, or substantially the same geometric region 222, may be used to identify the object of interest in the plurality of video frames 210, then the determined geometric region 222 may be substituted for any of those video frames 210. For example, if the exemplary soda can is in a huddle or is stationary before or after a game play, an exemplary embodiment may identify and determine the location of object of interest in a selected video frame 210. The determined object of interest data information identifying the location of the object of interest may then be substituted in adjacent or nearby video frames 210.

In some embodiments, the information that identifies and determines the location of object of interest in the video frames 210 may only be used in selected video frames 210. For example, if the display rate of the video frames 210 is one hundred frames per second, then the object of interest data information that that identifies and determines the location of object of interest in the video frame 210 may only be determined by the object ID module 320 in one or two of the video frames 210 presented during each second. Or, the information may be determined in video frames 210 that are temporarily separated from each other by a predefined durations, such as one or more seconds.

Further, in some embodiments, the object of interest data 214 may be added into the selected ones of the video frames 210. Because the user's perceptions of the presented video portion of the media content, and the user's reactions to changes in the location or other characteristics of the object of interest, is relatively slow compared to the rate of presentation of individual video frames 210, periodically incorporating the object of interest data 214 into the media content will be sufficient to enable the user to select the object of interest. That is, even though not all of the video frames 210 may have object of interest data 214, enough of the video frames 210 will have the object of interest data 214 so that the user may effectively select an object of interest.

In some embodiments, the object recognition logic may reside in any suitable memory medium. In an exemplary embodiment, the object recognition logic resides in the memory 326. In some embodiments, the object ID module 320 may comprise firmware, and/or may comprise hardware. For example, the object ID module 320 may employ a dedicated and/or special purpose processor system.

The object of interest data generator module 322 is configured to generate object of interest data 214, and its associated object of interest data information, based in part upon the location information of the object of interest determined by the object ID module 320. The object of interest data generator module 322 generates object of interest data 214 for the associated video frame 210 having the specified object of interest.

In an exemplary embodiment, the processor system 324 is configured to execute the various logic that determines object location information, that generates the object of interest data 214 and the object of interest data information, and/or that associates the object of interest data 214 with the particular video frame 210 that presents the selectable object of interest. In an exemplary embodiment, the processor system 324 processes the media content to insert the object of interest data 214 into the video frames 210 that present the object of interest. In some embodiments, the processor system 324 may be configured to add the object of interest data 214 and/or object of interest data information into other locations in the media content stream 202. In alternative embodiments, multiple processor systems may be used to identify the location of the object of interest and/or define the associated geometric regions 222 where the object of interest is presented in the video frame 210. Alternatively, or additionally, the processor system 324 may perform other functions, and/or may comprise a plurality of processors operating in a distributed fashion and/or operating in parallel with each other.

In another exemplary embodiment, the object identifier and object selection reward data synchronizer 106 may be a component of the media device 102 and/or the portable media device 118 and the media device 102 and/or the portable media device 118 may perform the object identification and other functionality of the object selection reward data synchronizer 106 described herein in real time or near real time as the program of interest is being received by the media device 102 and/or the portable media device 118.

In an exemplary embodiment, a single object selection reward server 108 may have object selection reward data for a plurality of different objects of interest. Further, the object selection reward server 108 may have different object selection reward data for a plurality of different media content streams. That is, other media devices 102 and/or the portable media devices 118 may concurrently access the object selection reward server 108 to obtain object selection reward data pertaining to other media content, such as a movie, commercial, advertisement or the like.

In an exemplary embodiment, the object selection reward data may itself include links to other sources of object selection reward data. For example, the presented graphical content 120 may present selectable links to other object selection reward data that is available from other sources. For example, the graphical content 120 may present a uniform resource locator (URL) or the like that is selectable by the user. Alternatively, or additionally, the graphical content 120 may allow the user to access entirely different media content, such as a movie that is available from a video on demand (VOD) system or a program that is available on another channel. For example, the graphical content 120 may be similar to an electronic program guide (EPG), or provide a soft link to the EPG, so that the user may change to the identified program in the graphical content 120.

The network 126 is illustrated as a generic communication system. In an exemplary application, the network 126 comprises the Internet. Alternatively, or additionally, the communication network 126 supports content delivery services, including, but not limited to, broadcast, streaming media, video-on-demand (VOD) services. Communication network 126 enables providing content of such content delivery services over network 126, and may comprise a telephony system, a radio frequency (RF) wireless system, a microwave communication system, terrestrial and over-the-air communication systems, a fiber optics system, an intranet system, a local access network (LAN) system, a local network, an Ethernet system, a cable system, a satellite system, a radio frequency system, a cellular system, and/or infrared system, or a hybrid system comprised of multiple types of communication media.

In the various embodiments, the portable media device 118 may comprise a suitable modem or other component that is configured to cause the portable media device 118 to connect to the object selection reward server 108 via the Internet. Alternatively, or additionally, the portable media device 118 may have a wireless transceiver that is configured to provide connectivity to a wireless system, such as a Wi-Fi system or the like. Alternatively, or additionally, the portable media device 118 may include a RF transceiver or the like that provides connectivity to a cellular network.

In some embodiments, the program of interest comprising the object of interest data 214 may be received by the object selection reward server 108. The object selection reward server 108 monitors for the object of interest data 214, and then transmits (pushes) the object selection reward data to the portable media device 118. For example, accessing the object selection reward data may be an interactive process that requires a relatively fast paced interaction with the user. By monitoring the object of interest data at the object selection reward server 108, the graphical content 120 may be more quickly presented to the user in response to a selection of the object of interest by the user.

Figure 4:
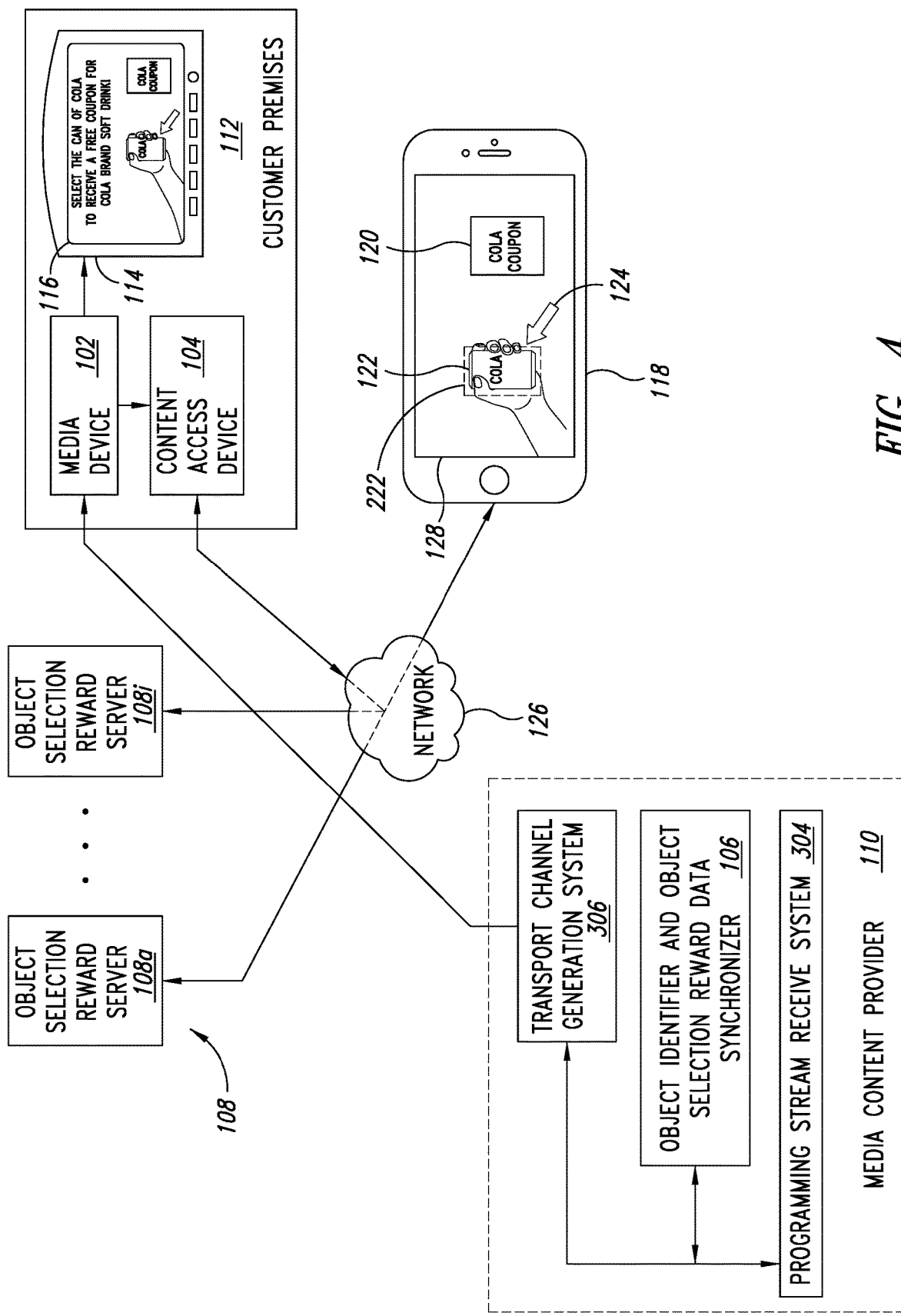
FIG. 4 is a block diagram of an embodiment of the media access system that employs a plurality of remotely located object selection reward servers, according to an example embodiment.

FIG. 4 is a block diagram of an embodiment of the media access system 100 that employs a plurality of remotely located object selection reward servers 108. Each of the plurality of object selection reward servers 108 may be located at any desired location where access to the network 126 is available. The object of interest data includes sufficient information to identify the location of, and to establish a communication link with, the particular one of the object selection reward servers 108 that has the object selection reward data associated with the program of interest that is being provided by the content access device 104.

In this exemplary system, the portable media device 118 is a cellular device that is configured to transmit and receive phone calls and/or to provide other media functions. In some instances, the user operates their portable media device 118 to establish a communication link to the content access device 104. In other instances, the object of interest data 214 automatically establishes a communication link between the portable media device 118 and the object selection reward servers 108a-108i that is providing the object selection reward data associated with the program of interest.

In this exemplary embodiment, the object selection reward servers 108a-108i are located remote from the location of the media content provider 110. For example, a first object selection reward server 108 may be located at the facilities of the local program provider (LPP) that originates the program of interest. Another object selection reward server 108 may be located at the site of a manufacturer, advertiser, seller, coupon issuer or other merchandiser that is marketing merchandise related to the selected object of interest. The exemplary portable media device 118 then directly accesses the particular object selection reward servers 108a-108i that has the object selection reward data associated with the selected object of interest.

In the various embodiments, the object selection reward servers 108 are configured to be concurrently accessible by a plurality of different ones of the content access devices 104 and/or the portable media devices 118. Thus, a single object selection reward server 108 may provide the same, or may provide different, object selection reward data to a plurality of concurrently connected content access devices 104 and/or the portable media devices 118 based on selected objects of interest.

Some embodiments may permit the user to selectively toggle between the presented program of interest and the presented graphical content 120. For example, when the display 128 of the portable media device 118 is relatively small, such as on a cellular phone, PDA, or the like, there may not be sufficient area on the display 128 to show both the program of interest and the object selection reward data with sufficient resolution and/or size. Accordingly, the graphical content 120 is presented separately from the program of interest. The graphical content 120 may be separately presented for some predefined duration and/or may be configured to await a response from the user. When the graphical content 120 is separately presented, some embodiments may be configured to pause the presentation of the program of interest. Presentation of the program of interest may then be resumed after presentation of the object selection reward data ends.

In the various embodiments, a plurality of different objects of interest may be identified in one video frame 210. A plurality of different object of interest data 214 may be generated for each object and included in the media content stream 202. For example, the media content may concurrently present a first object of interest and a second object of interest. Accordingly, the user may select among the first and second objects of interest, and upon selecting one of the presented plurality objects of interest, the interaction may be communicated to the corresponding object selection reward server and the graphical content 120 associated with that particular object of interest may be presented to the user. Further, some embodiments may be configured to permit the user to make multiple selections of different objects of interest. When the user selects multiple objects of interest, a corresponding number of different graphical content 120 (e.g., indicating multiple different rewards) is presented to the user.

In some embodiments where multiple objects or interest are concurrently presented, the communication links to respective object selection reward servers 108 are concurrently open. Further, if the user selects two or more objects of interest, multiple graphical content 120 may be concurrently displayed to the user.

An unexpected social benefit provided by the various embodiments of the media access system 100 is to improve content accessibility for individuals with impairments or disabilities. For example, a user with a hearing impairment may have opportunities to selectively access graphical and/or textual information that is being covered in the audio portion of the content stream. If the audio portion of the media content is being presented in a language that is different from the native language of the user, the user may have opportunities to selectively access graphical and/or textual information that is being covered in the audio portion of the content stream, which may be presented in any suitable language.

In some instances, where the object selection reward data is included in the video stream 204, user selection of the object of interest causes the object selection reward data residing in the media content stream 202 to be accessed so that the media device 102 and/or the portable media device 118 generate and present the graphical content 120. Further, one or more of the object selection reward servers 108*a*-108*i* may be accessed to obtain additional object selection reward data.

In an alternative embodiment, for at least one object of interest data 214, the media device 102 accesses the object selection reward data from one or more of the object selection reward servers 108*a*-108*i* when object of interest data 214 is processed. The accessed object selection reward data may then be incorporated into the media content stream 202 and/or may be separately communicated to the portable media device 118.

It should be emphasized that the above-described embodiments of the media access system 100 are merely possible examples of implementations of the disclosure. Many variations and modifications may be made to the above-described embodiments. All such modifications and variations are intended to be included herein within the scope of this disclosure and protected by the following claims.

In an example embodiment, components/modules of the media content provider 110, object selection reward server 108, media device 102 and portable media device 118 are implemented using standard programming techniques. For example, the object identifier and object selection reward data synchronizer 106 and applications of the media device 102 may be implemented as a "native" executable running on the processor system 324, along with one or more static or dynamic libraries. In other embodiments, the object identifier and object selection reward data synchronizer 106 and applications of the media device 102 may be implemented as instructions processed by a virtual machine that executes as one or more other programs. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the media content provider 110, object selection reward server 108, media device 102 and portable media device 118 to perform the operations described herein. In one embodiment, instructions cause one or more processors of the media content provider 110, object selection reward server 108, media device 102 and portable media device 118 or some other processor, such as an I/O controller/processor, to perform the operations described herein.

The embodiments described above may also use wellknown or other synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the system 100.

In addition, programming interfaces to the data stored as part of the the media content provider 110, object selection reward server 108, media device 102 and portable media device 118, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The media data stored on memory 326 or otherwise by the media content provider 110, object selection reward server 108, media device 102 and portable media device 118 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the system 100.

Furthermore, in some embodiments, some or all of the components of the media content provider 110, object selection reward server 108, media device 102 and portable media device 118 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 5:
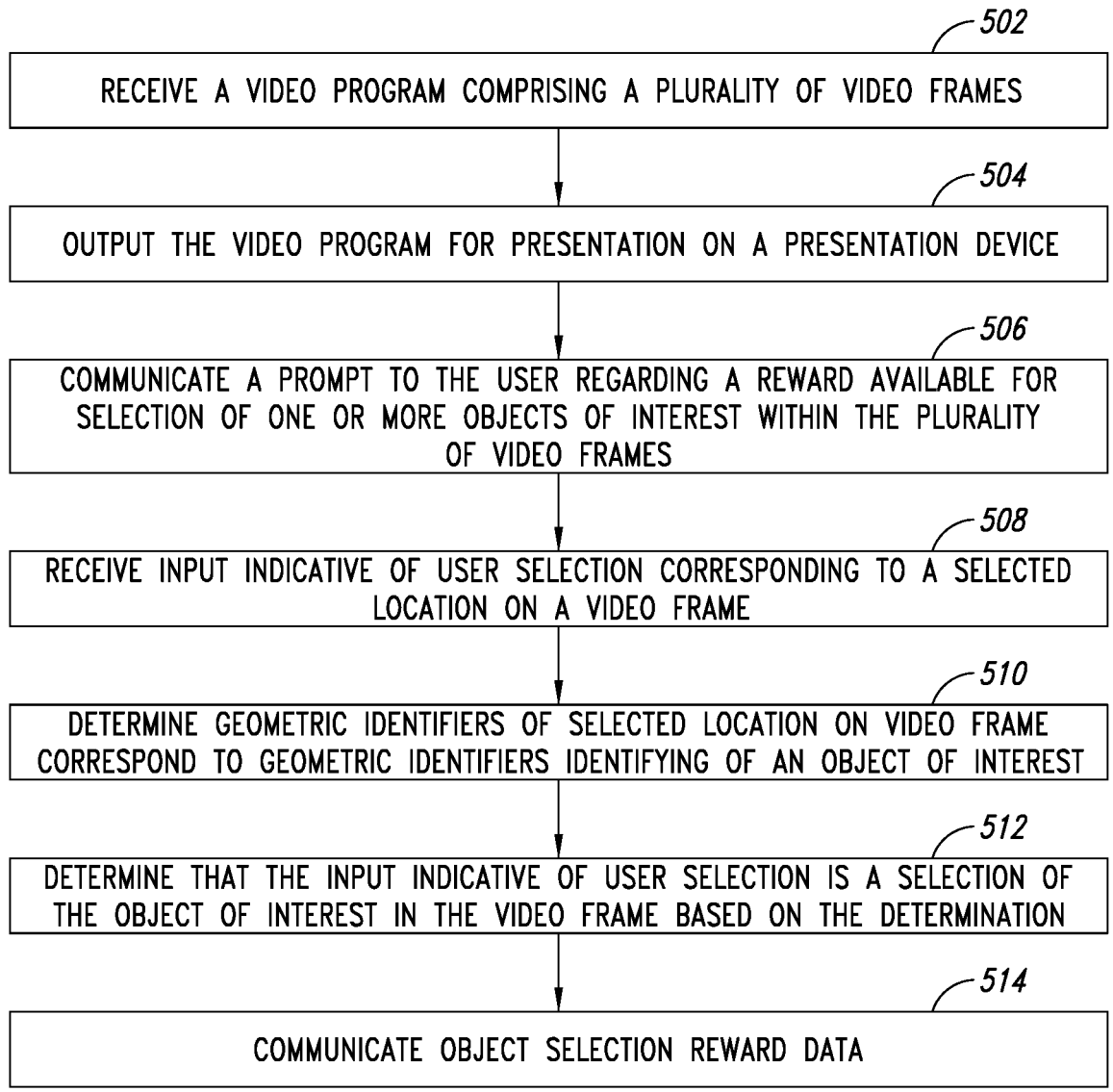
FIG. 5 is a flow diagram of an example method for blending interactive applications with television programming, according to one example embodiment.

FIG. 5 is a flow diagram of an example method for blending interactive applications with television programming, according to one example embodiment.

At 502, the media device 102 receives a video program comprising a plurality of video frames.

At 504, the media device 102 outputs the video program for presentation on a presentation device.

At 506, the media device 102 electronically communicates a prompt to the user regarding a reward available for selection of one or more objects of interest within the plurality of video frames.

At 508, the media device 102 receives input indicative of user selection corresponding to a selected location on a video frame of the video program being output by the media device.

At 510, the media device 102 determines that geometric identifiers of the selected location on the video frame correspond to geometric identifiers identifying a location within the video frame of an object of interest in the video frame.

At 512, the media device 102 determines that the input indicative of user selection is a selection of the object of interest in the video frame based on the determination that the geometric identifiers of the selected location within the video frame corresponds to geometric identifiers identifying a location within the video frame of an object of interest in the video frame.

At 514, in response to the determining that the input indicative of user selection is a selection of the object of interest in the video frame, the media device 102 electronically communicates object selection reward data. For example, object selection reward data may be communicated to the object selection reward server 108 as an indication that the user selected the object of interest. Also or instead, the object selection reward data may be communicated to the user to indicate a credit, coupon or other reward has been issued to the user for selection of the object of interest.

Figure 6:
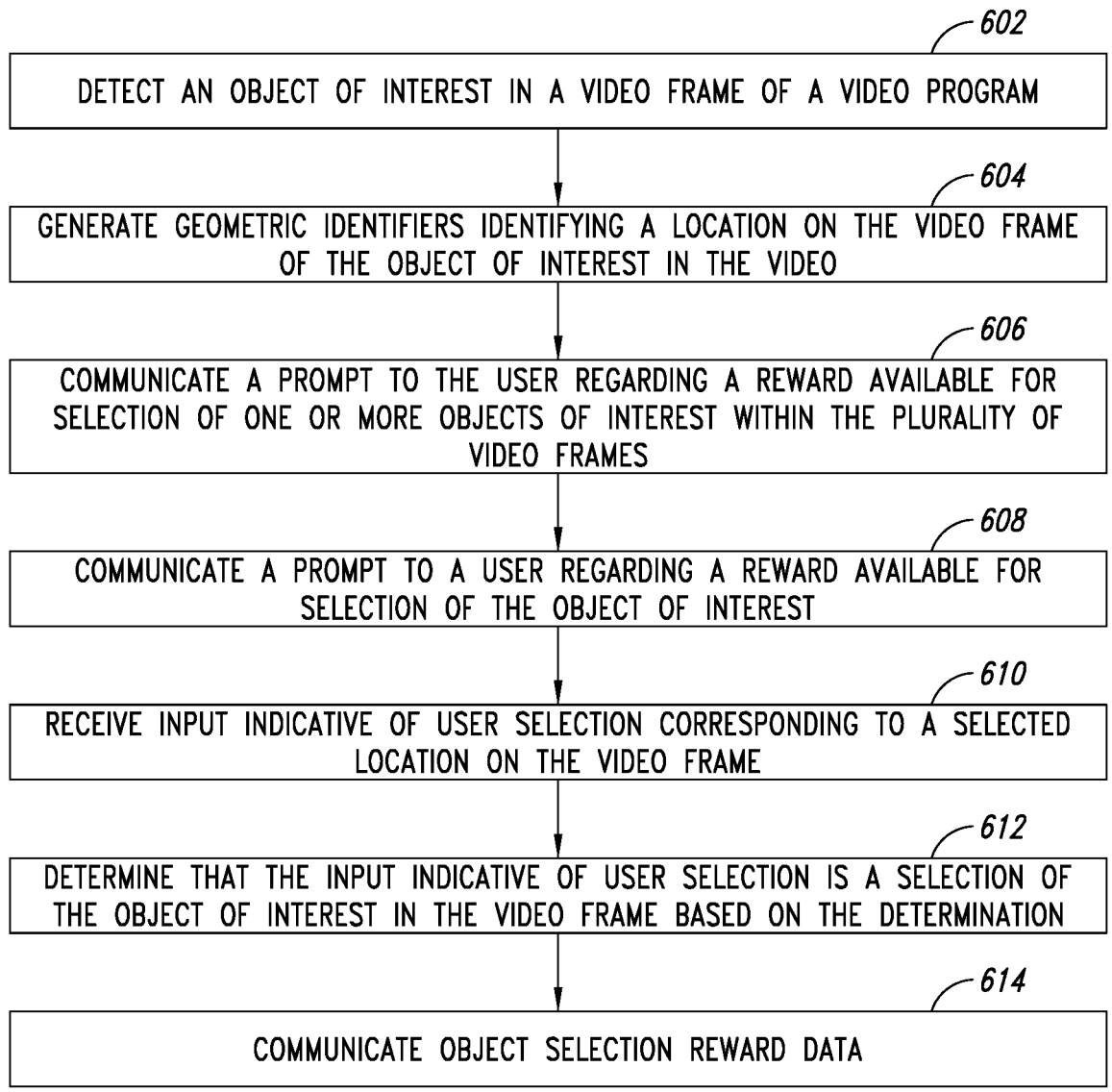
FIG. 6 is a flow diagram of an example method for blending interactive applications with television programming, according to another example embodiment.

FIG. 6 is a flow diagram of an example method for blending interactive applications with television programming, according to another example embodiment.

At 602, the media device 102 or media content provider 110 detects an object of interest in a video frame of a video program.

At 604, based on the detection of the object of interest in the video frame, the media device 102 or media content provider 110 generates geometric identifiers identifying a location on the video frame of the object of interest in the video frame;

At 606, the media device 102 optionally electronically communicates a prompt to a user regarding a reward available for selection of the object of interest within the video program.

At 608, the media content provider 110 or object selection reward server 108 optionally electronically communicates a prompt to a user regarding a reward available for selection of the object of interest within the video program.

At 610, the media device 102, media content provider 110 or object selection reward server 108 receives input indicative of user selection corresponding to a selected location on the video frame of the video program being output by a media device.

At 612, the media device 102, media content provider 110 or object selection reward server 108 determines that the input indicative of user selection is a selection of the object of interest in the video frame based on the determination that the geometric identifiers of the selected location on the video frame corresponds to geometric identifiers identifying the location on the video frame of an object of interest in the video frame.

At 614, in response to the determination that the input indicative of user selection is a selection of the object of interest in the video frame, the media device 102, media content provider 110 or object selection reward server 108 electronically communicates object selection reward data. For example, object selection reward data may be communicated to the object selection reward server 108 as an indication that the user selected the object of interest. Also or instead, the object selection reward data may be communicated to the user to indicate a credit, coupon or other reward has been issued to the user for selection of the object of interest.

Figure 7:
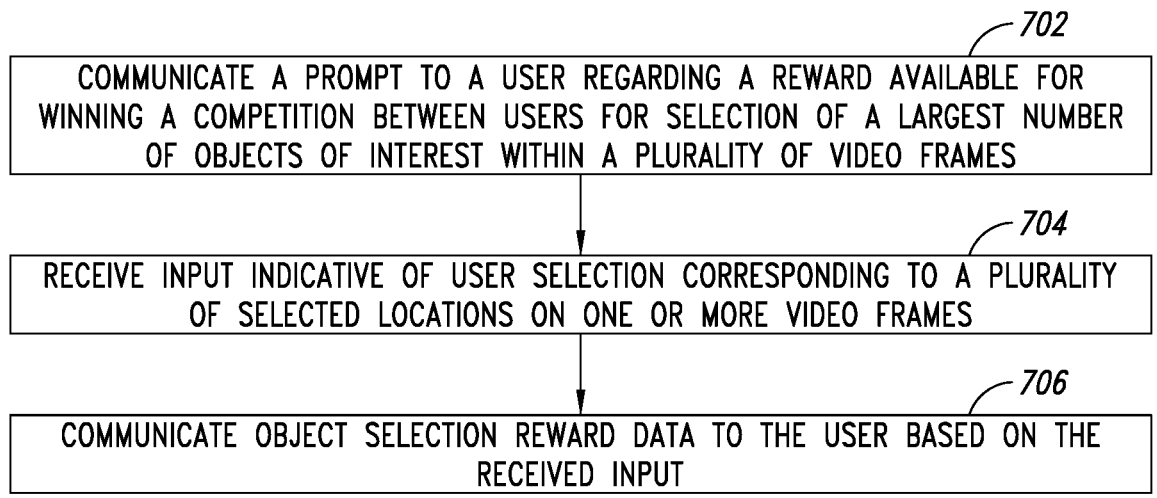
FIG. 7 is a flow diagram of an example method for blending interactive applications with television programming involving a game for selecting objects of interest in a broadcast television video program, according to an example embodiment.

FIG. 7 is a flow diagram of an example method for blending interactive applications with television programming involving a game for selecting objects of interest in a broadcast television video program, according to an example embodiment.

At 702, the media device 102 or portable media device 118 electronically communicates a prompt to a user regarding a reward available for winning a competition between users for selection of a largest number of objects of interest within a plurality of video frames of one or more segments of a broadcast television video program broadcast to the users.

At 704, the media device 102 or portable media device 118 receives input indicative of user selection corresponding to a plurality of selected locations on one or more video frames of the broadcast television video program.

At 706, the media device 102 or portable media device 118 electronically communicates object selection reward data to the user based on the received input indicative of user selection corresponding to a plurality of selected locations on one or more video frames of the broadcast television video program.

The media device 102 or portable media device 118 may determine a number of objects of interest selected by the user within the plurality of video frames of the one or more segments of the broadcast television video program broadcast to the users. The communication of object selection reward data to the user based on the received input may be based on the determined number of objects of interest selected by the user within the plurality of video frames. The media device 102 or portable media device 118 may determine that the input indicative of user selection corresponding to the plurality of selected locations on the one or more video frames of the broadcast television video program is selection of the number of objects of interest within the plurality of video frames based on a determination that geometric identifiers of the selected locations on the one or more video frames of the broadcast television video program corresponds to geometric identifiers identifying locations on the one or more video frames of the objects of interest within the plurality of video frames.

The electronic communication of object selection reward data may include communication of data to a device of the user, such as portable media device 118, indicative of a reward for winning a competition between users for selection of a largest number of objects of interest within the plurality of video frames.

The invention claimed is:

1. A method in a system for blending interactive applications with television programming, comprising:
  receiving, at a media device, a video program of a content stream comprising a plurality of video frames;
  detecting, by an application running on the media device, one or more objects of interest within the plurality of video frames, wherein the detecting, by the application running on the media device, one or more objects of interest within the plurality of video frames includes, for each video frame of a plurality of video frames:
    generating, by the media device, non-video object of interest data that:
      includes information that identifies where an object of interest is in the video frame; and
      includes information to identify the object of interest in a presented scene;
    outputting, by the media device, the video program for presentation on a presentation device;
    electronically communicating a prompt to the user regarding a reward available for selection of one or more objects of interest within the plurality of video frames;
    receiving, by the media device, input indicative of user selection corresponding to a selected location on a video frame of the video program being output by the media device; and
  in response to determining that the input indicative of user selection is a selection of the object of interest in the video frame, electronically communicating object selection reward data.

2. The method of claim 1 wherein the electronically communicating object selection reward data includes electronically communicating data to a device of the user indicative of a reward for the selection of the object of interest in the video frame.

3. The method of claim 2 wherein the reward is one or more of: a coupon for a product related to the object of interest, a product related to the object of interest, data enabling the user to purchase a product related to the object of interest, a service related to the object of interest, information related to the object of interest, a financial reward, and one or more points in a rewards system.

4. The method of claim 1 wherein the electronically communicating object selection reward data is performed by one or more of: the media device and the object selection reward server in operable communication with the media device that is configured to track selections of objects in video frames of video programs presented to users to facilitate rewards to be issued to users for selection of the objects.

5. The method of claim 1 wherein the electronically communicating object selection reward data includes electronically communicating selection of the object of interest in the video frame to the object selection reward server that is configured to track selections of objects in video frames of video programs presented to users to facilitate rewards to be issued to users for selection of the objects.

6. The method of claim 1 wherein the electronically communicating object selection reward data includes causing a message or graphical element to be overlaid on the video program indicative of a reward for the selection of the object of interest in the video frame.

7. The method of claim 1 wherein the electronically communicating object selection reward data includes causing a message or graphical element to be communicated, to a device of the user other than the presentation device, indicative of a reward for the selection of the object of interest in the video frame.

8. The method of claim 1 wherein the selection of the object of interest in the video frame comprises one or more of: a finger press on the object of interest; a finger tap on the object of interest; placement of a cursor on the object of interest; a selection button being activated on a remote control at or near a time when the video frame including the object of interest is output by the media device; a mouse click on the object of interest; a circle drawn around the object of interest; a particular shape drawn on the object of interest; and a particular color drawn on the object of interest.

9. A system for generating an application for blending interactive applications with television programs, comprising:
  at least one processor; and
  at least on memory coupled to the at least one processor, wherein the at least one processor is configured to generate an application that is configured to:
  detect, by the application running on a media device configured to output a video program of a content stream, an object of interest in a video frame of the video program, wherein the detecting, by the application running on the media device, the object of interest within the video frame includes:
    generating, by the media device, non-video object of interest data that:
      includes information that identifies where the object of interest is in the video frame; and
      includes information to identify the object of interest in a presented scene;
    based on the detection of the object of interest in the video frame, generate, by the application when running on the media device, geometric identifiers identifying a location on the video frame of the object of interest in the video frame;
    electronically communicate a prompt to a user regarding a reward available for selection of the object of interest within the video program; and
    receive input indicative of user selection corresponding to a selected location on the video frame of the video program being output by a media device.

10. The system of claim 9, wherein the application is further configured to:
  electronically communicate a prompt to the user regarding a reward available for selection of at least a minimum number of objects of interest within the plurality of video frames; and in response to input indicative of selection of at least the minimum number of objects of interest within the plurality of video frames, electronically communicate additional object selection reward data.

11. The system of claim 10 wherein the reward is one or more of: a coupon for a product related to the object of interest, a product related to the object of interest, data enabling the user to purchase a product related to the object of interest, a service related to the object of interest, information related to the object of interest, a financial reward, and one or more points in a rewards system.

12. The system of claim 9 wherein the application is further configured to, in response to the determination that the input indicative of user selection is a selection of the object of interest in the video frame, electronically communicate object selection reward data, and wherein the electronic communication of object selection reward data is performed by one or more of: the media device and the object selection reward server in operable communication with the media device that is configured to track selections of objects in video frames of video programs presented to users to facilitate rewards to be issued to users for selection of the objects.

13. The system of claim 9 wherein the application is configured to electronically communicate a prompt to a user regarding a reward available for selection of the object of interest within the video program by at least being configured to:

communicate the prompt to enable a user to purchase an item related to the object of interest based on geolocation data regarding the user as determined by the application.

* * * * *